(12) United States Patent
McDonnell

(10) Patent No.: US 11,702,753 B2
(45) Date of Patent: Jul. 18, 2023

(54) APPARATUS FOR THE ELECTROLYTIC PRODUCTION OF HYDROGEN, OXYGEN, AND ALKALINIZED SEAWATER

(71) Applicant: UNIVERSITY OF ALASKA FAIRBANKS, Fairbanks, AK (US)

(72) Inventor: Andrew McDonnell, Fairbanks, AK (US)

(73) Assignee: University of Alaska Fairbanks, Fairbanks, AK (US)

( * ) Notice: Subject to any disclaimer, the term of this patent is extended or adjusted under 35 U.S.C. 154(b) by 0 days.

(21) Appl. No.: 16/924,319

(22) Filed: Jul. 9, 2020

(65) Prior Publication Data

US 2021/0010143 A1 Jan. 14, 2021

Related U.S. Application Data

(60) Provisional application No. 62/872,165, filed on Jul. 9, 2019.

(51) Int. Cl.
| | | |
|---|---|---|
| *C25B 9/21* | (2021.01) | |
| *C25B 15/08* | (2006.01) | |
| *C25B 1/04* | (2021.01) | |
| *C02F 1/461* | (2023.01) | |
| *C25B 9/15* | (2021.01) | |

(52) U.S. Cl.
CPC .............. *C25B 9/21* (2021.01); *C02F 1/4618* (2013.01); *C25B 1/04* (2013.01); *C25B 9/15* (2021.01); *C25B 15/08* (2013.01); *C02F 2001/4619* (2013.01); *Y02E 60/36* (2013.01)

(58) Field of Classification Search
CPC .................................... C25B 9/19; C25B 9/21
See application file for complete search history.

(56) References Cited

U.S. PATENT DOCUMENTS

| 5,135,622 A * | 8/1992 | Abys ...................... C01G 55/00 |
| | | 204/539 |
| 9,586,181 B2 | 3/2017 | Eisaman et al. |
| 2011/0281959 A1* | 11/2011 | DiMascio ............... C25B 15/02 |
| | | 205/637 |
| 2014/0374274 A1* | 12/2014 | Kwak .................... B01D 61/42 |
| | | 205/748 |
| 2016/0215403 A1 | 7/2016 | DiMascio et al. |
| 2019/0085472 A1* | 3/2019 | Willauer ................. C25B 15/08 |
| 2019/0226098 A1* | 7/2019 | Masel ..................... B01J 41/13 |
| 2020/0080211 A1* | 3/2020 | Schmid ................... C25B 15/08 |

FOREIGN PATENT DOCUMENTS

CN 109607705 A * 4/2019 .......... C02F 1/46104

OTHER PUBLICATIONS

House, et al. (2007) "Electrochemical acceleration of chemical weathering as an energetically feasible approach to mitigating anthropogenic climate change" *Environ. Sci. Technol.* 41: 8464-8470.

Rau, et al. (2013) "Direct electrolytic dissolution of silicate minerals for air CO2 mitigation and carbon-negative H-2 production" *Proc. Natl. Acad. Sci.* 10: 10095-10100.

Willauer, et al. (2014) "Feasibility of CO2 extraction from seawater and simultaneous hydrogen gas generation using a novel and robust electrolytic cation exchange module based on continuous electrodeionization technology" *Ind. Eng. Chem. Res.* 53: 12192-12200.

Rau, et al. (2018) "The global potential for converting renewable electricity to negative-CO2-emissions hydrogen" Nature Climate Change 8: 621-625.

* cited by examiner

*Primary Examiner* — Ciel P Contreras
(74) *Attorney, Agent, or Firm* — Ballard Spahr LLP

(57) ABSTRACT

The invention generally relates an apparatus for generation of hydrogen and oxygen gases by utilizing seawater. The invention also relates to a method of making hydrogen and oxygen gas by utilizing anion exchange membranes and seawater. This abstract is intended as a scanning tool for purposes of searching in the particular art and is not intended to be limiting of the present invention.

17 Claims, 2 Drawing Sheets

APPARATUS FOR THE ELECTROLYTIC PRODUCTION OF HYDROGEN, OXYGEN, AND ALKALINIZED SEAWATER

CROSS-REFERENCE TO RELATED APPLICATIONS

This Application claims the benefit of U.S. Provisional Application No. 62/872,165, filed on Jul. 9, 2019, the contents of which are hereby incorporated by reference in their entirety.

BACKGROUND

The global climate is warming and the Earth's oceans are acidifying and losing oxygen as a result of humanity's emissions of carbon dioxide into the atmosphere. Mitigation of the associated risks will require large and immediate reductions in carbon dioxide emissions, a rapid transition to renewable energy sources, and the large-scale removal of carbon dioxide from the atmosphere, and direct mitigation of or adaptation to the associated impacts. Thus, new and improved processes and apparatuses are needed to facilitate these changes. These needs and others are met by the present invention.

SUMMARY

The disclosed processes and apparatuses can use the electrolysis of water to produce renewable hydrogen fuel, directly mitigate ocean acidification and deoxygenation, and remove carbon dioxide from the atmosphere by neutralizing and storing it in the oceans, primarily in the form of bicarbonate ions. Thus, the disclosed processes and apparatuses represent a "negative emissions" technology.

Relative to other methods of generating hydrogen, the disclosed process offers several advantageous opportunities for concomitant product and revenue generation. These multiple product and revenue streams can result in more economical production of hydrogen, something that has so far been a significant barrier to its wide scale adoption.

In brief, the disclosure is directed to an apparatus configured to produce hydrogen and oxygen gases useful for energy and industrial applications. Further, the disclosure is directed to an electrolytic process forming hydrogen and oxygen gases, while continuously adding alkalinity to seawater from the ocean. The treated seawater and/or oxygen then can be optionally returned to the ocean to provide environmental benefits including the counteraction of ocean acidification, ocean oxygenation, and the sequestration of carbon dioxide. Without wishing to be bound by theory, a potential economically favorable source for seawater and pathway for its discharge is the intake and outflow systems of existing thermal power plants or desalination plants.

Thus, in accordance with the purpose(s) of the invention, as embodied and broadly described herein, disclosed are apparatuses comprising: a cathode compartment comprising a cathode and configured for a continuous flow of a first reaction medium; an anode compartment comprising an anode and configured for a continuous flow of a second reaction medium; a central compartment separated from the cathode compartment with a first anion membrane and from the anode compartment with a second anion membrane; where the central compartment is configured to continuously receive a brine solution comprising a plurality of anions, cations, and a combination thereof; wherein the cathode and the anion are configured to receive a direct current to conduct an electrolysis reaction of the first reaction medium to produce a first reaction product and/or the second reaction medium to produce a second reaction product; and wherein the apparatus is configured to form an alkalinized brine solution.

Also disclosed are systems comprising the disclosed apparatus and means for separating the hydrogen gas from the first reaction product. In yet further aspects, the invention relates to a system comprising the disclosed apparatus and means for separating the oxygen gas from the second reaction product. In still further aspects, the invention relates to a system comprising the disclosed apparatus and means for returning alkalinized seawater and or oxygen gas into an ocean. In still further aspects, the invention relates to a system comprising the disclosed apparatus and means for removing carbon dioxide from the air with alkalinized seawater. In still further aspects, the invention relates to a system comprising the disclosed apparatus and means for neutralizing the acidic solution from the second reaction product by reacting it with alkaline minerals or optionally concentrating the acid to be utilized as a desired product of the system.

Also disclosed are methods comprising: continuously providing a brine solution to the disclosed apparatus; applying a direct current to the cathode and anode of the apparatus to initiate an electrolysis reaction; forming a first reaction product comprising a hydrogen gas and water; forming a second reaction product comprising an oxygen gas and an acidified water; and collecting the hydrogen gas and/or oxygen gas.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE DRAWINGS

The accompanying figures, which are incorporated in and constitute a part of this specification, illustrate several aspects and together with the description serve to explain the principles of the invention.

Figure 1A:
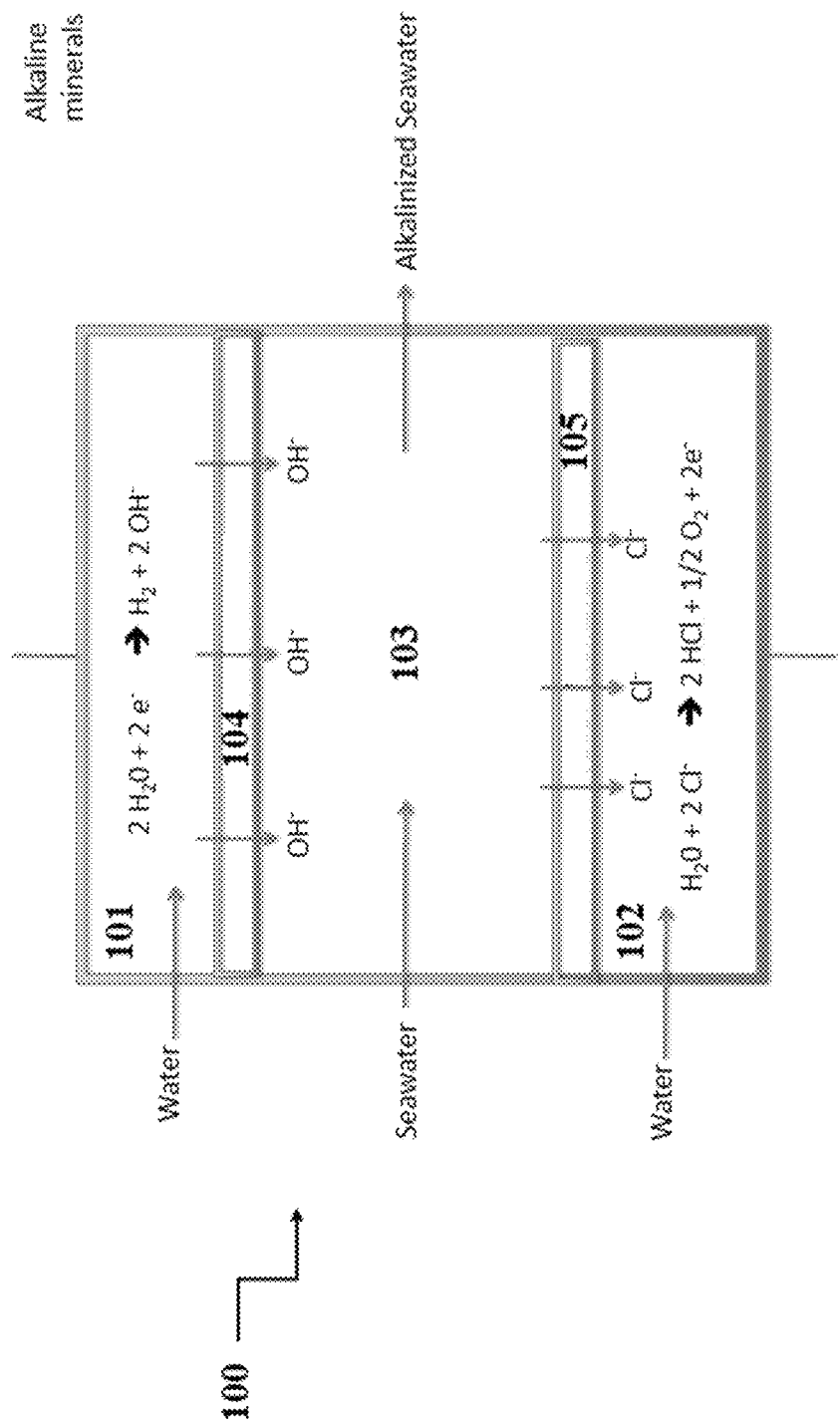
FIG. 1A shows a representative schematic of an exemplary apparatus.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

A. DEFINITIONS

Listed below are definitions of various terms used to describe this invention. These definitions apply to the terms as they are used throughout this specification, unless otherwise limited in specific instances, either individually or as part of a larger group.

As used herein, nomenclature for compounds, including organic compounds, can be given using common names, IUPAC, IUBMB, or CAS recommendations for nomenclature.

As used in the specification and the appended claims, the singular forms "a," "an" and "the" include plural referents unless the context clearly dictates otherwise. Thus, for example, reference to "a compartment," "a membrane," or "an apparatus" includes two or more such compartments, membranes, apparatuses, and the like.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

All percentages, ratios and proportions herein are by weight, unless otherwise specified. All temperatures are in degrees Celsius (° C.) unless otherwise specified.

Throughout the description and claims of this specification the word "comprise" and other forms of the word, such as "comprising" and "comprises," means including but not limited to, and is not intended to exclude, for example, other additives, components, integers, or steps.

As used herein, the term "substantially" means that the subsequently described event or circumstance completely occurs or that the subsequently described event or circumstance generally, typically, or approximately occurs. For example, when the specification discloses that the first reaction product is substantially removed, a person skilled in the relevant art would readily understand that not all reaction product is removed. Rather, this term conveys to a person skilled in the relevant art that the remaining reaction product can be present to an extent that does not hinder desirable results or causes adverse effects.

As used herein, the terms "optional" or "optionally" means that the subsequently described event or circumstance can or cannot occur, and that the description includes instances where said event or circumstance occurs and instances where it does not.

It will be understood that, although the terms "first," "second," etc. may be used herein to describe various elements, products, system parts, etc. These elements, products, and system parts should not be limited by these terms. These terms are only used to distinguish one element, product or system part from another element, product, or system part. Thus, a first product, element, or system part discussed below could be termed a second product, element, or system part without departing from the teachings of example embodiments.

As used herein, the term "negative emissions" refers to reducing the amount of carbon dioxide in the atmosphere by capturing it, extracting it from the environment and storing it in a geologic, oceanic, terrestrial, or other reservoir.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. APPARATUSES

Disclosed are apparatuses comprising: a cathode compartment comprising a cathode and configured for a continuous flow of a first reaction medium; an anode compartment comprising an anode and configured for a continuous flow of a second reaction medium; and a central compartment separated from the cathode compartment by a first anion membrane and from the anode compartment by a second anion membrane; wherein the central compartment is configured to continuously receive a brine solution comprising a plurality of anions, cations, and a combination thereof; wherein the cathode and the anion are configured to receive a direct current to conduct an electrolysis reaction of the first reaction medium to produce a first reaction product and/or the second reaction medium to produce a second reaction product; and wherein the apparatus is configured to form an alkalinized brine solution.

Also disclosed are apparatuses comprising: a cathode compartment comprising a cathode and configured for a continuous flow of a first reaction medium comprising a purified water; an anode compartment comprising an anode and configured for a continuous flow of a second reaction medium comprising a purified water; and a central compartment separated from the cathode compartment by a first anion membrane and from the anode compartment by a second anion membrane; wherein the central compartment is configured to continuously receive a brine solution comprising a plurality of anions and a plurality of cations; wherein the cathode is configured to receive a direct current to conduct an electrolysis reaction of the first reaction medium to produce a first reaction product comprising one or more of hydrogen gas and hydroxide ions, and wherein the first anion membrane is configured to pass at least a portion of the first reaction product; wherein the anode is configured to receive a direct current to conduct an electrolysis reaction of the second reaction medium to produce a second reaction product comprising one or more of hydrogen ions, chlorine gas, and hydroxide ions, and wherein the second anion membrane is configured to pass at least a portion of the anions in the brine solution to the anion compartment; wherein the central compartment is configured to receive the at least a portion of the first reaction product that passed the first anion membrane; wherein the anode compartment is configured to receive the at least a portion of the anions that passed the second anion compartment; and wherein the apparatus is configured to form an alkalinized brine solution.

Use of an electrolysis apparatus to increase the pH value of water is well known in the art. Generally, electrolysis is a very useful and simple process for separating chemically bonded elements and compounds, which is performed by applying an electric current across a pair of electrodes (i.e., an anode and a cathode) immersed in an electrolyte such as water or an aqueous solution. The electrolyte is the medium to conduct electricity as it consists of free ions in solution. One important application of electrolysis is to produce oxygen and hydrogen by electrolyzing water in an electrolytic cell having a separator arranged between the anode and the cathode. In this case, acid water is produced at the anode and alkaline water is produced at the cathode.

Alkaline water is known to find a wide range of applications. For example, alkaline water is useful for drinking, disinfecting and cleaning, depressing an abnormal intestinal fermentation, and the like. Another application is that alkaline water is able to remove toxic components and the greenhouse gases $SO_2$, $NO_2$, and $CO_2$ in a flue gas, because of the high pH value and the alkalinity of the alkaline water. Alkaline water may be produced by the addition of an alkali agent such as NaOH in the water. Alternatively, ion membrane electrolysis of, for example, seawater may be used. However, due to the presence of sodium chloride, electrolyzing seawater or saline water always results in the generation of chlorine gas at the anode side, which is likely to re-dissolve back in the water treated, and, thus, to decreases the pH value of the water. This consequently affects the rate or performance of generating alkaline water of high pH values. In addition, chlorine gas is known to be harmful to human health and the environment, especially to the organisms living in seawater and soil. For these reasons, new and improved methods of brine water electrolysis are needed.

Here, a three-compartment flow-through electrolytic ion exchange module is described. Direct current is applied to the cathode and anode, as purified water is circulated through lateral compartments where electrolysis takes place. A brine solution (e.g., seawater) is pumped through a central compartment of the module that is separated from the lateral anode and cathode compartments by anion exchange membranes. The lateral compartments are packed with anion exchange resin, while the central compartment is packed with inert media, thereby providing structure for the membranes that separate them. During operation, hydrogen gas is electrolytically produced at the cathode, along with hydroxide ions. Hydroxide ions pass through the anion exchange membrane into the central brine solution compartment, thereby reducing the pH and increasing the alkalinity of the brine solution. Anions from the brine solution exchange through the anion membrane and into the anode compartment of the reactor module. Within the anode compartment, hydrogen ions, and oxygen gas are produced.

Without wishing to be bound by theory, advantages of the disclosed apparatus include, but are not limited to: the production and sale of hydrogen gas for use as a renewable fuel, industrial chemical feedstock, and/or medium for renewable energy storage, transmission, or export; the production and sale of oxygen gas for enhanced combustion, industrial chemical feedstock, aquaculture, and/or the mitigation of ocean deoxygenation; the generation and sale of carbon credits or offsets to compliance or voluntary offset markets, governments, corporations, or individuals; the provisioning of environmental services including the mitigation of climate change, ocean acidification, and ocean deoxygenation; and the provisioning of energy services including the facilitation of enhanced renewable energy penetration, grid regulation, energy storage, and energy security.

A representative schematic of a disclosed apparatus is shown in FIG. 1A. Thus, referring to FIG. 1A, apparatus 100 can comprise three compartments: cathode compartment 101, anode compartment 102, and central compartment 103. Cathode compartment 101, which comprises a cathode, is configured for continuous flow of a first reaction medium such as, for example, water. Cathode compartment 101 is separated from central compartment 103 by first anion membrane 104. Anode compartment 102, which comprises an anion, is configured for continuous flow of a second reaction medium such as, for example, water. Anode compartment 102 is separated from central compartment 103 by second anion membrane 105. Central compartment 103 is configured to continuously receive a brine solution such as, for example seawater, which comprises a plurality of anions and cations. Both cathode compartment 101 and anode compartment 102 are configured to receive a direct current. With respect to cathode compartment 101, the current conducts an electrolysis reaction on the first reaction medium, thereby producing a first reaction product. As shown, the first reaction product can comprise, for example, hydrogen gas and hydroxide ions. At least a portion of the first reaction products (e.g., hydroxide ions) produced pass through first anion membrane 104 into central compartment 103, thereby reacting with the brine solution to produce alkalinized brine solution and other anions (e.g., Cl⁻, sulfate). At least a portion of these anions (e.g., Cl⁻, sulfate) pass through second anion membrane 105 into anode compartment 102. Alternatively, second anion membrane 105 can selectively exclude the transfer of certain ions (e.g., Cl— ions), but allow the passage of other ions (e.g., sulfate). With respect to anode compartment 102, the current conducts an electrolysis reaction on the second reaction medium, thereby producing a second reaction product. As shown, the second reaction product can comprise, for example, hydrogen ions and oxygen gas. In this way, the disclosed apparatus is configured to produce alkalinized brine solution.

In various aspects, the apparatus itself is modular. In various further aspects, multiple modules can be combined in a large variety of manners to create a system of the desired outputs.

1. Cathode Compartment

In various aspects, the disclosed apparatus comprises a cathode compartment comprising a cathode and configured for a continuous flow of a first reaction medium. Examples of first reaction mediums include, but are not limited to, purified water.

In various aspects, the first reaction medium is continuously supplied to the cathode compartment. In such aspects, the first reaction medium comprises a purified water. In certain aspects, the purified water exhibits a conductivity of less than about 20 S/cm, less than about 10 S/cm, less than about 5 S/cm, less than about 1 S/cm, less than about 100 mS/cm, less than about 50 mS/cm, less than about 10 mS/cm, less than about 5 mS/cm, less than about 100 ΩS/cm, less than about 50 μS/cm, less than about 20 μS/cm, less than about 15 μS/cm, less than about 10 μS/cm, or less than about 5.5 μS/cm as measured at room temperature (i.e., about 25° C.). It is understood that in certain aspects, the purified water can be obtained by reverse osmosis or deionization.

A representative equation illustrating the reaction that occurs at the cathode compartment is shown below:

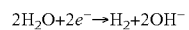

$$2H_2O+2e^- \rightarrow H_2+2OH^-$$

The cathode compartment is separated from the central compartment by a first anion membrane. In various aspects, the first anion membrane is configured to pass at least a portion of the first reaction product from the cathode compartment to the central compartment. It is understood that the anion membrane selectively passes anions in preference to cations, and further, that the anion membrane can be manufactured of any suitable material, based on cost, chemical stability, mechanical robustness, electrochemical performance characteristics, anion selectivity, and the nature of the process involved. In certain aspects, the anion membrane comprises a hydroxide exchange membrane. In certain aspects, the anion membranes are resistant to oxidation and a wide range of temperatures. Suitable materials are known to those skilled in the art and selection of a particular membrane material is considered within the skill of those knowledgeable in this field. Commercially available examples of heterogeneous and homogeneous anion membranes that are useful in the present invention include, but are not limited to, Neosepta anion exchange membranes manufactured by ASTOM Corporation and Selemion AAV anion exchange membranes manufactured by Asahi-Glass.

In various aspects, the first reaction product comprises one or more of a hydrogen gas and hydroxide ions. In various further aspects, at least a portion of the hydroxide ions pass through the first anion membrane into the central compartment. Without being bound by theory, this transfer can reduce the pH of the brine solution in the central compartment, and also increase the alkalinity of the brine solution. The remainder of the first reaction product can be sent to, for example, a vacuum stripper in order to separate hydrogen gas from the water.

In various aspects, the cathode compartment can further comprise inert media. In still further aspects, the cathode compartment can only comprise a cathode. In still further aspects, the cathode compartment can comprise a cathode, an anion exchange membrane, and inert media.

2. Anode Compartment

In various aspects, the disclosed apparatus comprises an anode compartment comprising an anode and configured for a continuous flow of a second reaction medium. Examples of second reaction mediums include, but are not limited to, purified water.

The anode compartment is separated from the central compartment by a second anion membrane. In various aspects, the second anion membrane is configured to pass at least a portion of the anions in the brine solution to the anode compartment. It is understood that the first anion membrane and the second anion membrane can be the same or different depending on the desired application.

In various aspects, the second anion membrane is configured to pass chlorine ions from the brine solution to the anode compartment. In various further aspects, the second anion membrane is configured to prevent chlorine ion transfer. In such aspects, the anion membrane can comprise a selective anion exchange membrane configured to exclude chlorine ion transfer. It is understood, that in some aspects, a chlorine gas can be produced at the anode. In certain aspects, the chlorine gas can produced either in conjunction with or in place of oxygen gas. In certain aspects, chlorine gas can be an undesired byproduct, while in other aspects, chlorine gas can be a desired byproduct that can be sold or used for any desired application. In certain aspects, if the chlorine gas is formed, the apparatus can be configured to react with hydrogen gas that is formed in the cathode compartment. In certain aspects, the apparatus can be configured to comprise a separate fuel cell where the reaction between the chlorine gas and the hydrogen gas can occur. In such aspects, the resulting energy can be used to minimize the overall energy demand of the process.

In certain aspects, as discussed above, the second anion membrane can comprise a selective anion membrane that excludes passing of the Cl⁻ ions. In some exemplary aspects, such membrane can allow passing of the sulfate ions. In still further aspects, the apparatus can be configured to receive a current density suitable for oxygen gas production. In some exemplary aspects, an oxygen selective anode can be used. Still in further aspects, the apparatus can be configured to contain an ionic solution configured to receive Cl⁻ ions through the central compartment (instead of brine solution), then transfer the hydroxide ions to the brine solution via a separate process.

In various aspects, the second reaction medium can comprise a purified water and at least a portion of the anions present in the brine solution that passed through the second anion membrane. In certain aspects, the purified water present in the second reaction medium can exhibit conductivity as described above. In certain aspects, the anions present in the brine solution and passed through the second anion membrane can comprise Cl⁻, sulfate, and/or any other anion found in brine solution. The anion membrane can also be chosen for its selectivity in order to exclude the transfer of Cl— ions, but allow the passage of other ions such as sulfate or any other anions found in the brine solution.

A representative equation illustrating the reaction that occurs at the anode compartment is shown below:

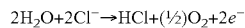

$$2H_2O + 2Cl^- \rightarrow HCl + (\tfrac{1}{2})O_2 + 2e^-$$

In various aspects, the second reaction product comprises one or more of hydrogen ions and oxygen gas. These resultant products can then be sent to a vacuum stripper, for example, in order to separate oxygen from the acidified water.

In certain aspects, the anode compartment can further comprise inert media. In still further aspects, the anode compartment can only comprise an anode. In still further aspects, the anode compartment can comprise an anode, an anion exchange membrane, and inert media.

3. Central Compartment

In various aspects, the disclosed apparatus comprises a central compartment separated from the cathode compartment by a first anion membrane and from the anode compartment by a second anion membrane.

In various aspects, the central compartment is substantially free of material. In various further aspects, the central compartment comprises inert media.

In various aspects, a brine solution is continuously supplied to the central compartment. The brine solution can be a natural or artificial brine solution. In various aspects, the brine solution is seawater. In various further aspects, the seawater can be a filtered or treated seawater that may or may not be designed to optimized the performance of the reactor and/or reduce fouling.

In various aspects, the central compartment is configured to receive at least a portion of the first reaction product that passed through the first anion membrane. In various further aspects, at least a portion of the hydroxide ions pass through the first anion membrane from the cathode compartment into the central compartment. Without being bound by theory, this transfer can reduce the pH of the brine solution in the central compartment, and also increase the alkalinity of the brine solution.

In various aspects, the central compartment is configured to dispel anions from the brine solution such as, for example, Cl⁻ ions, through the second anion membrane into the anode compartment. The resultant alkalinized brine solution can then be, for example, bubbled with ambient air to remove carbon dioxide from the air and to convert it into bicarbonate ions, oxygenated, and then returned to the ocean. Alternatively, the resultant alkalinized brine solution can be returned to the ocean without air bubbling, allowing carbon dioxide uptake from the atmosphere to occur via air-sea gas exchange across the surface of the ocean.

C. SYSTEMS

In one aspect, disclosed are systems comprising a disclosed apparatus. Thus, in various aspects, disclosed are systems comprising an apparatus comprising: a cathode compartment comprising a cathode and configured for a continuous flow of a first reaction medium; an anode compartment comprising an anode and configured for a continuous flow of a second reaction medium; and a central compartment separated from the cathode compartment by a first anion membrane and from the anode compartment by a second anion membrane; wherein the central compartment is configured to continuously receive a brine solution comprising a plurality of anions, cations, and a combination thereof; wherein the cathode and the anion are configured to receive a direct current to conduct an electrolysis reaction of the first reaction medium to produce a first reaction product and/or the second reaction medium to produce a second reaction product; and wherein the apparatus is configured to form an alkalinized brine solution.

Also disclosed are systems comprising an apparatus comprising: a cathode compartment comprising a cathode and configured for a continuous flow of a first reaction medium comprising a purified water; an anode compartment comprising an anode and configured for a continuous flow of a second reaction medium comprising a purified water; and a central compartment separated from the cathode compartment by a first anion membrane and from the anode compartment by a second anion membrane; wherein the central compartment is configured to continuously receive a brine solution comprising a plurality of anions and a plurality of cations; wherein the cathode is configured to receive a direct current to conduct an electrolysis reaction of the first reaction medium to produce a first reaction product comprising one or more of hydrogen gas and hydroxide ions, and wherein the first anion membrane is configured to pass at least a portion of the first reaction product; wherein the anode is configured to receive a direct current to conduct an electrolysis reaction of the second reaction medium to produce a second reaction product comprising one or more of hydrogen ions, chlorine gas, and hydroxide ions, and wherein the second anion membrane is configured to pass at least a portion of the anions in the brine solution to the anion compartment; wherein the central compartment is configured to receive the at least a portion of the first reaction product that passed the first anion membrane; wherein the anode compartment is configured to receive the at least a portion of the anions that passed the second anion compartment; and wherein the apparatus is configured to form an alkalinized brine solution.

As further disclosed herein, the disclosed three-compartment apparatus can provide various resultant product streams. The product stream from the cathode compartment can be sent to, for example, a vacuum stripper in order to separate hydrogen gas from the water. The product stream from the anion compartment can be sent to, for example, an alternative vacuum stripper to separate oxygen from the acidified water. The resultant acidified water can then be neutralized in a reactor with crushed alkaline silicate rocks, yielding silicon dioxide and a brine solution. Finally, the alkalinized brine solution from the central compartment can be bubbled with ambient air to remove carbon dioxide from the air and convert it into bicarbonate ions, then oxygenated, and returned to the ocean. Alternatively, the alkalinized brine solution can be returned to the ocean without air bubbling, allowing carbon dioxide uptake from the atmosphere to occur via air-sea gas exchange across the surface ocean. In either case, if non-fossil fuel energy is used to power the process, it results in the removal of carbon dioxide out of the atmosphere and storage in the form of bicarbonate ions in the ocean, and therefore constitutes a "negative emissions" technology system.

Figure 1B:
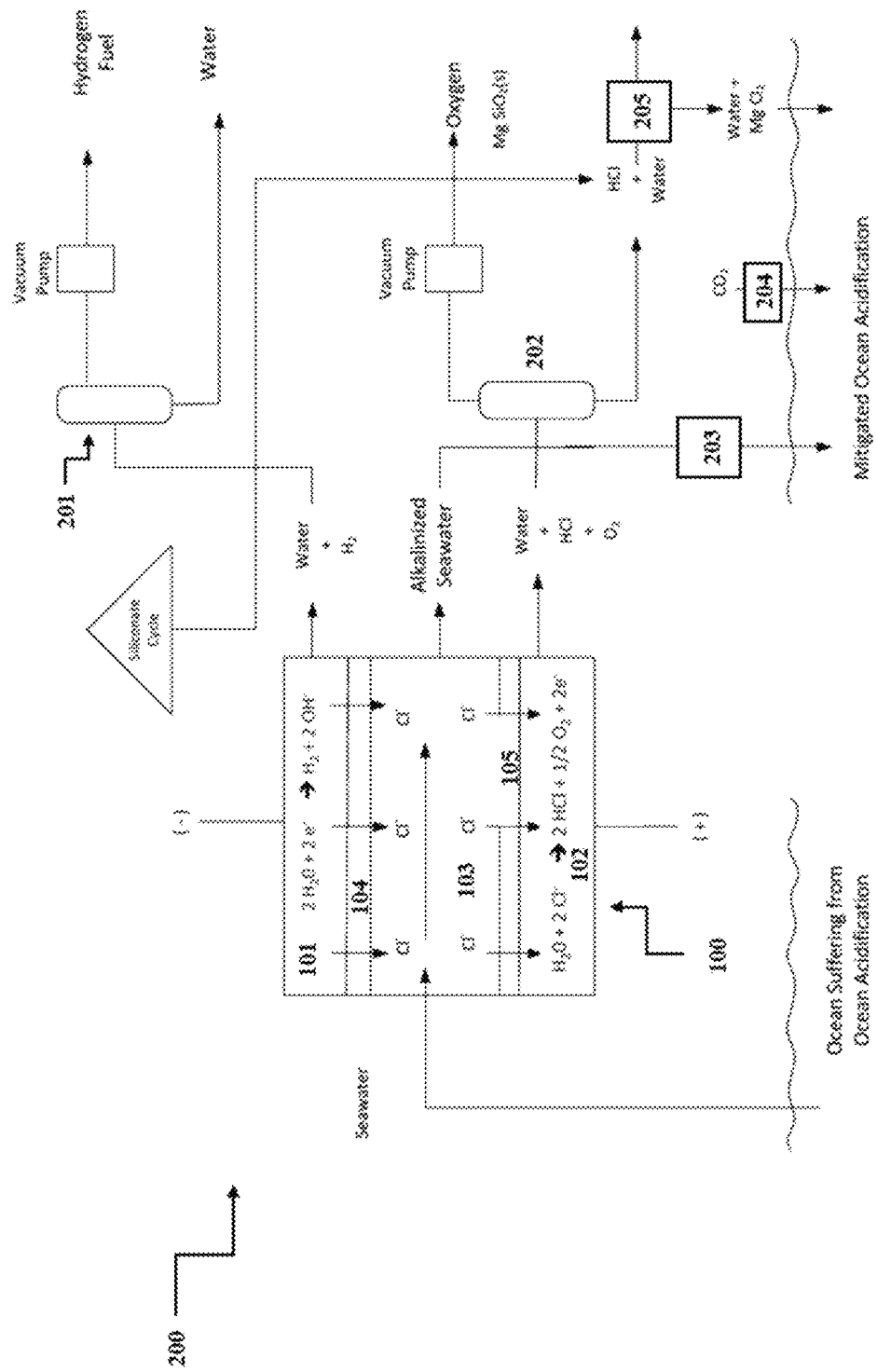
FIG. 1B shows a representative schematic representation of an exemplary system comprising an exemplary apparatus.

A representative schematic of a disclosed system is shown in FIG. 1B. Thus, referring to FIG. 1B, system 200 can comprise apparatus 100 having three compartments (i.e., cathode compartment 101, anode compartment 102, and central compartment 103), which can produce three product streams. Cathode compartment 101 can produce a first product stream comprising, for example, water and hydrogen gas. This first product stream can be exposed to means 201 for separating the hydrogen gas from the first reaction product (e.g., vacuum stripper, heated vessel, membrane degasifier, inert gas bubbler). Anode compartment 102 can produce a second product stream comprising, for example, water, hydrogen ions, and oxygen gas. This second product stream can be exposed to means 202 for separating the oxygen gas from the second reaction product (e.g., vacuum stripper, heated vessel, membrane degasifier, inert gas bubbler). The remaining second reaction product can then be further subjected to means 205 for neutralizing the acidic solution of the second reaction product with alkaline minerals (e.g., a dump, heap, tank, in situ leaching process, a pond, a vat, continuously stirred, a fluidized bed reactor). Central compartment 103 can produce alkalinized brine solution, which can be returned an ocean via means 203 (e.g., direct discharge, outflow pipelines, diffusers). Finally, the resultant alkalinized brine solution, now back in the ocean, together with means 204 (e.g., air-sea gas exchange, bubbling), to remove carbon dioxide from the air.

In various aspects, the system further comprises means for separating the hydrogen gas from the first reaction product. Examples of means for separating hydrogen gas from the first reaction product include, but are not limited to, a vacuum stripper, heated vessel, membrane degasifier, inert gas bubbler, or some combination thereof.

In various aspects, the system further comprises means for separating the oxygen gas from the second reaction product. Examples of means for separating oxygen gas from the second reaction product include, but are not limited to, a vacuum stripper, heated vessel, membrane degasifier, inert gas bubbler, or some combination thereof.

In various aspects, the system further comprises means for neutralizing the acidic solution of the second reaction product with alkaline minerals. Examples of means for neutralizing the acidic solution of the second reaction product include, but are not limited to, a dump, heap, tank, or in situ leaching process; or a pond, vat, continuously stirred, or fluidized bed reactor, or some combination thereof.

In various aspects, the system further comprises means for returning alkalinized seawater into an ocean. Examples of means for returning alkalinized seawater into an ocean include, but are not limited to, direct discharge from a shore-based, or offshore facility, outflow pipelines, or underwater diffusers.

In various aspects, the system further comprises means for removing carbon dioxide from the air with alkalinized brine solution. Examples of means for removing carbon dioxide from the air with alkalinized brine solution include, but are not limited to, natural air-sea gas exchange, or enhanced air sea gas exchange through active bubbling or mixing.

D. METHODS OF USING A DISCLOSED APPARATUS

In one aspect, disclosed are methods of using a disclosed apparatus. Thus, in various aspects, disclosed are methods comprising continuously providing brine solution to a disclosed apparatus. In a further aspect, the method further comprises applying a direct current to the cathode and/or anode of the apparatus, thereby initiating an electrolysis reaction. In a still further aspect, the method further comprises forming a first reaction product comprising hydrogen gas and water. In yet a further aspect, the method further comprises forming a second reaction product comprising oxygen gas and acidified water. In an even further aspect, the method further comprises collecting the hydrogen gas and/or the oxygen gas. In a still further aspect, the method further comprises forming an alkalinized brine solution.

In various aspects, disclosed is hydrogen gas produced by a disclosed method. In various aspects, disclosed is an oxygen gas produced by a disclosed method. In various aspects, disclosed is an alkalinized brine solution produced by a disclosed method.

In a further aspect, the method comprises: (1) continuously providing brine solution to a disclosed apparatus; (2) applying a direct current to the cathode and anode of the apparatus to initiate an electrolysis reaction; (3) forming a first reaction product comprising a hydrogen gas and water; (4) forming a second reaction product comprising an oxygen gas and an acidified water; and (5) collecting the hydrogen gas and/or the oxygen gas.

In a further aspect, the apparatus comprises: a cathode compartment comprising a cathode and configured for a continuous flow of a first reaction medium; an anode compartment comprising an anode and configured for a continuous flow of a second reaction medium; and a central compartment separated from the cathode compartment by a first anion membrane and from the anode compartment by a second anion membrane; wherein the central compartment is configured to continuously receive brine solution comprising a plurality of anions, cations, and a combination thereof; wherein the cathode and the anion are configured to receive a direct current to conduct an electrolysis reaction of the first reaction medium to produce a first reaction product and/or the second reaction medium to produce a second reaction product; and wherein the apparatus is configured to form an alkalinized brine solution.

In a further aspect, the apparatus comprises: a cathode compartment comprising a cathode and configured for a continuous flow of a first reaction medium comprising a purified water; an anode compartment comprising an anode and configured for a continuous flow of a second reaction medium comprising a purified water; and a central compartment separated from the cathode compartment by a first anion membrane and from the anode compartment by a second anion membrane; wherein the central compartment is configured to continuously receive brine solution comprising a plurality of anions and a plurality of cations; wherein the cathode is configured to receive a direct current to conduct an electrolysis reaction of the first reaction medium to produce a first reaction product comprising one or more of hydrogen gas and hydroxide ions, and wherein the first anion membrane is configured to pass at least a portion of the first reaction product; wherein the anode is configured to receive a direct current to conduct an electrolysis reaction of the second reaction medium to produce a second reaction product comprising one or more of hydrogen ions, chlorine gas, and hydroxide ions, and wherein the second anion membrane is configured to pass at least a portion of the anions in the brine solution to the anion compartment; wherein the central compartment is configured to receive the at least a portion of the first reaction product that passed the first anion membrane; wherein the anode compartment is configured to receive the at least a portion of the anions that passed the second anion compartment; and wherein the apparatus is configured to form an alkalinized brine solution.

In various aspects, a direct current is applied to the cathode and/or to the anode, as purified water is circulated through the anode compartment and/or the cathode compartment where electrolysis takes place.

In various aspects, brine solution is pumped through a central compartment that is separated from the anode compartment and from the cathode compartment by a first and a second anion exchange membrane, as further described above. In various further aspects, the anode compartment and the cathode compartment are packed with anion exchange resin, while the central compartment is packed with inert media, thereby providing structure for the membranes that separate them.

In certain aspects, the method disclosed herein produces a first reaction product. The first reaction product can comprise, for example, hydrogen gas and hydroxide ions. In still further aspects, at least a portion of the first reaction product passes through the first anion membrane. In certain aspects, the at least a portion of the first reaction product that passes through the first anion membrane comprises hydroxide ions. In yet other aspects, hydroxide anions pass into the central brine solution compartment, thereby increasing the pH and alkalinity of the brine solution.

In still further aspects, the brine solution comprises a plurality of anions, cations, or a combination thereof. In certain aspects, at least a portion of the anions in the brine solution pass through the second anion membrane into the anode compartment of the apparatus. In further aspects, within the anode compartment, the second reaction product can be formed. In yet other aspects, the second reaction product can comprise hydrogen ions, oxygen gas, or a combination there of.

In still further aspects, the first reaction product from the cathode compartment can be sent to a first vacuum stripper in order to separate hydrogen gas from the water. In yet other aspects, the second reaction product from the anion compartment can be pumped to a second vacuum stripper to separate oxygen from acidified water. In still further aspects, the acidified water can be neutralized in a neutralizing reactor or leach heap. In such aspects, the neutralization can be done, for example and without limitation with alkaline silicate minerals, yielding silicon dioxide and a brine solution.

In still further aspects, the alkalinized brine solution can be collected from the central compartment. In yet other aspects, the alkalinized brine solution can be bubbled with ambient air to remove carbon dioxide from the air and convert it into bicarbonate ions, then oxygenated, and returned to the ocean. In still further aspects, the oxygen product can be directly bubbled into subsurface of ocean waters.

In still further aspects, the alkalinized brine solution can be returned to the ocean without air bubbling, allowing carbon dioxide uptake from the atmosphere to occur via air-sea gas exchange across the surface ocean. In certain aspects, the disclosed process can be powered by a non-fossil fuel energy. In such aspects, the removal of carbon dioxide out of the atmosphere and storage in the form of bicarbonate ions in the ocean provides a desirable "negative emissions technology."

In certain aspects, the disclosed invention has many potential uses and revenue streams once commercialized including, but not limited to: a) the production and sale of hydrogen gas for use as a renewable fuel, industrial chemical feedstock, and/or medium for renewable energy storage, transmission, or export; b) the production and sale of oxygen gas for enhanced combustion, industrial chemical feedstock, aquaculture, and/or the mitigation of ocean deoxygenation; c) the generation and sale of carbon credits or offsets to compliance or voluntary offset markets, governments, corporations, or individuals; d) the provisioning of environmental services including the mitigation of climate change, ocean acidification, and ocean deoxygenation; e) the provisioning of energy services including the facilitation of enhanced renewable energy penetration, grid regulation, energy storage, and energy security. It is understood that in some exemplary aspects, the mitigation of ocean deoxygenation can be done by bubbling into subsurface ocean water.

In still further aspects, the process disclosed herein can be powered by stranded renewable energy resources located far away from populations centers. In yet other aspects, the process can be sited and scaled appropriately for small remote coastal villages and their locally available renewable resources. In yet other aspects, the process can be deployed at a large scale wherever large amounts of renewable energy are available.

E. REFERENCES

Dimascio, F., Hardy, D. R., Lewis, M. K., Willauer, H. D. & Williams, F. Extraction of Carbon Dioxide and Hydrogen from seawater and hydrocarbon production therefrom. US patent application US20160215403A1 (2016).

Willauer, H. D., Dimascio, F., Hardy, D. R. & Williams, F. W. Feasibility of CO2 extraction from seawater and simultaneous hydrogen gas generation using a novel and robust electrolytic cation exchange module based on continuous electrodeionization technology. Ind. Eng. Chem. Res. 53, 12192-12200 (2014).

Rau, G. H., Bourcier, W., Singleton, M. J. & Smith, M. M. Direct electrolytic dissolution of silicate minerals for air CO2 mitigation and carbon-negative H-2 production. Proc. Natl. Acad. Sci. 10, 10095-10100 (2013).

Rau, G. H., Willauer, H. D. & Jason Ren, Z. The global potential for converting renewable electricity to negative-CO2-emissions hydrogen. Nat. Clim. Chang. (2018). doi: 10.1038/s41558-018-0203-0

House, K. Z., House, C. H., Schrag, D. P. & Aziz, M. J. Electrochemical acceleration of chemical weathering as an energetically feasible approach to mitigating anthropogenic climate change. Environ. Sci. Technol. 41, 8464-8470 (2007).

Eisaman, M. D. & Littau, K. Electrodialytic separation of CO2 gas from seawater. US Patent, (2017).

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus comprising:
    a cathode compartment comprising a cathode and configured for a continuous flow of a first reaction medium;
    an anode compartment comprising an anode and configured for a continuous flow of a second reaction medium;
    a central compartment separated from the cathode compartment by a first anion membrane and from the anode compartment by a second anion membrane; and
    a brine solution comprising a plurality of anions and cations, wherein the brine solution is located in the central compartment,
    wherein the central compartment is configured to continuously receive the brine solution;
    wherein the cathode is configured to receive a direct current to conduct an electrolysis reaction of the first reaction medium to produce a first reaction product and/or the anode is configured to receive a direct current to conduct an electrolysis reaction of the second reaction medium to produce a second reaction product;
    wherein the first anion membrane is configured to pass at least a portion of the first reaction product from the cathode compartment to the central compartment;
    wherein the second anion membrane is configured to pass at least a portion of the anions in the brine solution from the central compartment to the anode compartment; and
    wherein the apparatus is configured to form an alkalinized brine solution.

2. The apparatus of claim 1, wherein the first reaction medium comprises purified water.

3. The apparatus of claim 1, wherein the second reaction medium comprises a purified water and the portion of the anions that passed through the second anion membrane.

4. The apparatus of claim 1, wherein the second reaction product comprises hydrogen ions and $O_2$.

5. The apparatus of claim 1, wherein the first reaction product comprises $H_2$ and hydroxide ions.

6. The apparatus of claim 1, wherein the brine solution is seawater.

7. The apparatus of claim 1, wherein the central compartment has an outlet in fluid communication with a means for removing a gas.

8. The apparatus of claim 1, wherein the cathode compartment has an outlet in fluid communication with a means for separating a gas from the first reaction product.

9. The apparatus of claim 1, wherein the anode compartment has an outlet in fluid communication with a means for separating a gas from the second reaction product.

10. The apparatus of claim 1, wherein the brine solution is present in the central compartment and wherein the brine solution is seawater, wherein the central compartment has an outlet in fluid communication with a means for removing a gas, wherein the cathode compartment has an outlet in fluid communication with a means for separating a gas from the first reaction product, and wherein the anode compartment has an outlet in fluid communication with a means for separating a gas from the second reaction product.

11. An apparatus comprising:
    a cathode compartment comprising a cathode and configured for a continuous flow of a first reaction medium;
    an anode compartment comprising an anode and configured for a continuous flow of a second reaction medium; and
    a central compartment separated from the cathode compartment by a first anion membrane and from the anode compartment by a second anion membrane,
    wherein the central compartment is configured to continuously receive a brine solution comprising a plurality of anions and cations;
    wherein the central compartment has an outlet in fluid communication with a means for removing a gas;
    wherein the cathode is configured to receive a direct current to conduct an electrolysis reaction of the first reaction medium to produce a first reaction product and/or the anode is configured to receive a direct current to conduct an electrolysis reaction of the second reaction medium to produce a second reaction product;
    wherein the first anion membrane is configured to pass at least a portion of the first reaction product from the cathode compartment to the central compartment;
    wherein the second anion membrane is configured to pass at least a portion of the anions in the brine solution from the central compartment to the anode compartment; and
    wherein the apparatus is configured to form an alkalinized brine solution.

12. The apparatus of claim 11, wherein the gas is present and comprises $CO_2$.

13. An apparatus comprising:
    a cathode compartment comprising a cathode and configured for a continuous flow of a first reaction medium;

an anode compartment comprising an anode and configured for a continuous flow of a second reaction medium; and a central compartment separated from the cathode compartment by a first anion membrane and from the anode compartment by a second anion membrane, wherein the central compartment is configured to continuously receive a brine solution comprising a plurality of anions and cations;

wherein the central compartment has an outlet in fluid communication with a means for removing a gas;

wherein the cathode is configured to receive a direct current to conduct an electrolysis reaction of the first reaction medium to produce a first reaction product and/or the anode is configured to receive a direct current to conduct an electrolysis reaction of the second reaction medium to produce a second reaction product;

wherein the first anion membrane is configured to pass at least a portion of the first reaction product from the cathode compartment to the central compartment;

wherein the second anion membrane is configured to pass at least a portion of the anions in the brine solution from the central compartment to the anode compartment;

wherein one or both of the anode compartment and the cathode compartment has an outlet in fluid communication with a means for separating a gas from the first and/or second reaction products; and wherein the apparatus is configured to form an alkalinized brine solution.

14. The apparatus of claim 13, wherein the cathode compartment has an outlet in fluid communication with the means for separating a gas from the first reaction product.

15. The apparatus of claim 14, wherein the gas is present and is hydrogen.

16. The apparatus of claim 13, wherein the anode compartment has an outlet in fluid communication with the means for separating a gas from the second reaction product.

17. The apparatus of claim 16, wherein the gas is present and is oxygen.

* * * * *